United States Patent
Frippiat et al.

(10) Patent No.: US 10,208,873 B2
(45) Date of Patent: Feb. 19, 2019

(54) FLUIDIC VALVE

(71) Applicant: Safran Aero Boosters S.A., Herstal (Milmort) (BE)

(72) Inventors: Cédric Frippiat, Theux (BE); Jean-Christian Bomal, Melen (BE); Nicolas Paulus, Liège (BE)

(73) Assignee: Safran Aero Boosters S.A., Herstal (Milmort) (BE)

( * ) Notice: Subject to any disclaimer, the term of this patent is extended or adjusted under 35 U.S.C. 154(b) by 274 days.

(21) Appl. No.: 15/226,836

(22) Filed: Aug. 2, 2016

(65) Prior Publication Data
US 2017/0037984 A1    Feb. 9, 2017

(30) Foreign Application Priority Data
Aug. 3, 2015  (BE) .................................. 2015/5489

(51) Int. Cl.
| | | |
|---|---|---|
| *F16K 11/04* | (2006.01) | |
| *F16K 31/42* | (2006.01) | |
| *F16K 11/048* | (2006.01) | |
| *F16K 11/07* | (2006.01) | |

(52) U.S. Cl.
CPC .......... *F16K 31/423* (2013.01); *F16K 11/048* (2013.01); *F16K 11/07* (2013.01); *F16K 11/0716* (2013.01); *F16K 31/426* (2013.01)

(58) Field of Classification Search
CPC .. F16K 31/423; F16K 31/426; F16K 11/0716; F16K 11/07; F16K 11/048
See application file for complete search history.

(56) References Cited

U.S. PATENT DOCUMENTS

| | | | |
|---|---|---|---|
| 2,526,709 A | 10/1950 | Tait | |
| 3,378,031 A * | 4/1968 | Hatashita | ............ F16K 31/0631 137/596.17 |
| 4,150,695 A | 4/1979 | Kosugui | |
| (Continued) | | | |

FOREIGN PATENT DOCUMENTS

| | | |
|---|---|---|
| EP | 2 157 344 A1 | 2/2010 |
| GB | 1 526 630 A | 9/1978 |
| (Continued) | | |

OTHER PUBLICATIONS

International Search Report and Written Opinion, completed Apr. 15, 2016, issued in corresponding Belgian Application No. BE 2015/5489, filed Aug. 3, 2015, 11 pages.

*Primary Examiner* — Eric Keasel
(74) *Attorney, Agent, or Firm* — Christensen O'Connor Johnson Kindness PLLC (57) ABSTRACT

A fluid valve is suitable for use with a hydraulic circuit of an item of aircraft equipment. The fluid valve includes a valve body having one inlet, two outlets and a communication channel with an external pressure source. The fluid valve further includes an electric solenoid actuator located in the valve body and having a movable ferromagnetic pilot. A valve member is movable inside valve body to at least partially block a passage between said inlet and one of the two outlets. The valve member at least partially defines first and second cavities. A fixed limiter is disposed within the communication channel such that a displacement of the movable pilot causes a variation in pressure in one of the first and second cavities to produce a force for moving the valve member.

7 Claims, 6 Drawing Sheets

(56) References Cited

U.S. PATENT DOCUMENTS

| | | | | |
|---|---|---|---|---|
| 4,245,671 A | * | 1/1981 | Kosugui | F15B 13/0431 |
| | | | | 137/625.6 |
| 4,445,528 A | | 5/1984 | Miki et al. | |
| 4,538,129 A | * | 8/1985 | Fisher | F16K 31/082 |
| | | | | 137/625.65 |
| 4,619,289 A | * | 10/1986 | Tsuru | B60T 8/364 |
| | | | | 137/627.5 |
| 5,218,996 A | * | 6/1993 | Schmitt-Matzon | B60T 8/36 |
| | | | | 137/596.17 |
| 6,047,718 A | * | 4/2000 | Konsky | F16K 1/443 |
| | | | | 137/614.18 |
| 2010/0301248 A1 | | 12/2010 | Yamamoto et al. | |
| 2013/0312843 A1 | | 11/2013 | Franconi et al. | |

FOREIGN PATENT DOCUMENTS

| | | |
|---|---|---|
| GB | 2 119 481 A | 11/1983 |
| GB | 2 343 935 A | 5/2000 |
| GB | 2 417 546 A | 3/2006 |
| JP | 61-31783 A | 2/1986 |
| WO | 83/03455 A1 | 10/1983 |
| WO | 2014/111096 A1 | 7/2014 |

* cited by examiner

Fig. 11

FLUIDIC VALVE

TECHNICAL FIELD

The present disclosure relates to a proportional fluid valve, for example a three-way valve.

BACKGROUND

US2004/016372 A1 describes a fluid valve comprising an electrical solenoid actuator. When an electric current is passed through the solenoid actuator, it is possible to move a pilot called a 'push pin' from a first position to a second position. This pilot, which is not ferromagnetic in US2004/016372A1, is connected to a ferromagnetic armature. A movable valve member is connected to the pilot, and serves to control the flow rate of fluid between the inlet and outlet ducts of the fluid valve. Particularly in paragraph [0015], US2004/016372A1 teaches that the valve member is designed to move in a manner equivalent to that of the pilot.

The valve described in US2004/016372 A1 has a number of drawbacks. For some applications, it is desirable for the valve member to be able to move a long distance or travel over a long path. A long travel path of the valve member enables proportional regulation of larger flow rates. In fact, if one attempts to regulate a large flow rate with a short travel path, sensitivity is lost (the same millimeter of travel would represent a larger flow rate differential). Moreover, if the travel path is not long enough, the valve member might induce unacceptably large charge losses (even when the valve is completely open). At the same time, it is generally desirable to limit charge losses to the valve terminals, so it is essential for the travel path to be suitable for the flow rate that passes through it. The applications for which large travel paths are more beneficial are thus large flow rate proportional regulation applications (more than 1500 L/h, for example).

For the valve of US2004/016372 A1, some long travel paths may become impossible to achieve. On the other hand, with this known system, as the required length of the valve member travel path increases, so the overall mass of the fluid valve also becomes greater. In order to achieve long travel paths, in fact, a large grand valve member and/or a large pilot must be provided. This increases the weight of the fluid valve. On the other hand, if the moving elements (valve member and pilot) are large, then it is generally necessary to provide an actuator solenoid (or coil) that is large enough to be able to move them: A device must be provided that is capable of exerting a substantial force on the pilot. In this case, it often becomes necessary to pass an electric current through the solenoid that is sufficient to generate a magnetic field strong enough to displace the moving elements such as the pilot. However, for certain applications, for example aviation, it is desirable to have a valve of limited size and weight and/or to be able to use a small current in the solenoid.

SUMMARY

According to a first aspect, one of the objects of the present disclosure is to provide a proportional fluid valve having an electric actuator in which the valve member is able to complete a long travel path while still limiting the mass of the valve and the current required in the electric actuator.

To this end, the inventors suggest the following fluid valve.

Fluid valve for a hydraulic circuit in an item of aircraft equipment comprising:

a hollow valve body having an inlet, two outlets and a communication path with an external pressure source;

an electric solenoid actuator disposed in the hollow of the hollow valve body and comprising a displaceable ferromagnetic pilot;

a valve member that is displaceable inside the valve body to at least partly block a passage between said inlet and of the two outlets, wherein said valve member at least partly defines a first and a second cavity located on either side of said valve member in the hollow of the valve body, a fixed limit to the level of (or in) said communication channel such that a displacement of said movable pilot induces a pressure change in one of said first and second cavities to exert a displacement force on said valve member and thus change a fluid flow rate between the inlet and the two outlets.

The communication channel thus assures a fluid connection between a part of the hollow in the valve body and a cavity outside the valve holding a fluid which is under an external (or reference) pressure.

The pilot thus functions as a variable limiter depending on its position.

With the fluid valve of the present disclosure, a displacement of the pilot creates a pressure differential between the first and second cavities. This pressure differential creates a displacement force which acts on the valve member. If this force is strong enough, it is able to displace the valve member. As will be shown in the following text, it is possible to induce a large displacement of the valve member even if the pilot does not move far and/or if the force acting thereon is weak. This is made possible in particular by the presence of the first and second cavities, which are defined at least in part by the valve member, the communication channel between the hollow valve body and an external pressure source, and the presence of the fixed limiter. A displacement of the pilot, even if it is small and triggered by a weak force, can create a pressure differential between said two cavities which is enough to displace the valve member over a long travel path. Thus, the pilot does not have to undergo a large displacement to cause the valve member to complete a long travel path, and it is not necessary to exert a large force on the pilot. The size of the pilot may thus be reduced, which enables the weight of a fluid valve to be minimised. Since the pilot is of small dimensions, it is not necessary to provide an extremely powerful electric actuator. Consequently, the size (and thus also the weight) of the actuator may be reduced, and the same applies for the current that is introduced to move the pilot. Finally, the fluid valve according to the present disclosure enables the use of a valve member that completes a large travel path while limiting the weight of the fluid valve and the current required in the electric actuator.

With the fluid valve of the present disclosure, it is possible to create large displacements (or long travel paths) of the valve member, even if the pilot is only displaced by a short distance. The fluid valve according to the present disclosure may thus be considered an amplification valve. In general, a person skilled in the art considers a valve member travel path longer than 4 mm to be a long travel path. The mass of the valve according to the present disclosure may be less than 2 kg. It may preferably be as low as 1.5 kg, even 1 kg.

With the fluid valve according to the present disclosure, a displacement of the valve member is not necessarily identical to the displacement of the pilot which induces the valve member displacement. For the fluid valve of the present disclosure, the pilot and the valve member are generally not connected mechanically. In some embodiments, the pilot and the valve member are never in contact with each other.

The electric actuator electric of the fluid valve according to the present disclosure does not require at large supply current, even if the valve member is required to move over large travel paths. For example, for a solenoid type electric actuator, a current of 0 to 100 mA may be used on a 16-29 VDC bus, preferably an EEC-FADEC type. A small electric current may thus be sufficient to displace the valve member over a long travel path. The fluid valve according to the present disclosure is not of the 'Direct Drive' type. The term 'inlet' and 'outlets' with regard to the hollow valve body are interchangeable. Indeed this is only a function of the flow direction of the fluid whose flow rate is controlled by the valve according to the present disclosure. Thus, the valve body might comprise two inlets and one outlet. Equally, the valve body might comprise more than one inlet and more than two outlets.

The term displacement force is understood to mean a force that has a course and a direction according to a possible displacement direction of the movable valve member. The pilot is sometimes called the plunger by those skilled in the art. The communication channel is designed to enable the hollow of the hollow valve body to communicate with a reference pressure. The term 'fixed limiter' is known to the person skilled in the art. Various types of fixed limiter are conceivable. One non-limiting example is a circular aperture in a wall, the thickness of which is of the same order of magnitude as its diameter. Other examples include an angle bend, a diameter constriction.

The fluid valve according to the present disclosure also has other advantages. It may be less expensive than other existing solutions. It also has good performance characteristics. Generally, the existing hydraulically amplified valves (servovalves) cannot be used for long travel paths. If a large flow rate is allowed to pass through a servovalve of the related art, its performance will be affected (loss of resolution, increased charge losses). With the valve according to the present disclosure, amplification may be achieved without sacrificing good performance characteristics (resolution, precision, repeatability). Thus, with the valve according to the present disclosure it is possible to achieve the following characteristics: accuracy in open loop of 10% on the position of the valve member, resolution of 5% on the position of the valve member, repeatability of 2% on the position of the valve member. The valve according to the present disclosure is also particularly simple and does not require any elements with complicated shape. The principle of movement amplification of the valve member may be important. The actuator interface may be a command of a computer signal type (EEC-FADEC for example). The fluid valve according to the present disclosure may be used in many applications: in an aircraft for example, but not exclusively.

In other exemplary embodiments, the valve member at least partly defines more than two cavities, for example three or four. In general, a displacement of the pilot may cause a pressure variation in the first cavity. In other examples, the pilot may cause a pressure variation in the second cavity.

The fluid valve according to the present disclosure is a proportional valve, a term which is known to a person skilled in the art. Consequently, it is possible to control the passage between the inlet and each of the two outlets over the entire range of the valve member travel path. The valve according to the present disclosure is therefore not simply an ON-OFF valve, unlike the valve described in U.S. Pat. No. 4,445,528 (for this valve, the pressure in a cavity falls sharply rather than undergoing a progressive variation). With the valve according to the present disclosure, there are an infinite number of stable positions for the valve member: it thus enables true control of the fluid flow rate between the inlet and the two outlets, in contrast to U.S. Pat. No. 4,445,528 (this is made possible by true control of the pressures in the first and/or second cavity). The electric actuator of the fluid valve according to the present disclosure may be described as immersed, unlike the valve of U.S. Pat. No. 2,526,709. Thus, if the fluid valve according to the present disclosure is able to control a flow rate of oil, the electric actuator is immersed in the oil when the fluid valve is operating.

According to a possible variant, the valve body comprises two communication channels, each being capable of ensuring fluid communication between the hollow of the valve body and an external pressure source, and the fluid valve includes a fixed limiter inside (or at the level of) each communication channel, such that a displacement of said movable pilot causes a pressure variation in each of said first and second cavities to create a displacement force on said valve member to vary the flow rate of a fluid between the inlet and the two outlets.

Accordingly, the communication channel may thus serve to ensure a fluid connection between the hollow of the valve body and an external cavity holding a fluid with an given pressure. Each communication channel may connect the hollow at a single external pressure or at two different external pressures.

In the preferred embodiment, control of the movement of the valve member is even better and the amplification of the force acting thereon may be even greater.

The fluid valve according to the present disclosure is preferably configured such that a displacement of said movable pilot causes a variation in pressure that produces a force on said pilot in the opposite direction to said displacement. In this way, a more stable fluid valve is created, because the force acting on the pilot is in the opposite direction to the displacement thereof.

According to a preferred variant, the hollow of the valve body includes a cavity containing:
said electric solenoid actuator and
a communication channel with a reference pressure,
to enable constant pressure to be maintained on said movable pilot regardless of its position.

This corresponds to an equilibrated version of the fluid valve.

According to another possible embodiment, the communication channel opens into the first cavity. The second cavity is preferably connected to a downstream pressure source. The fixed limiter may include a passage (or communication channel or machined gap) between the pilot and a cylindrical wall that surrounds it. Such a cylindrical wall is an internal wall of the valve body where the electric solenoid actuator is located.

According to another possible embodiment, said valve member at least partly defines a third cavity in the valve body hollow. This embodiment may serve to enhance the stability of the pilot.

According to a possible embodiment, at least a part of the valve member comprises a ferromagnetic material, and the electric solenoid actuator is capable of exerting a magnetic displacement force on said ferromagnetic part of the valve member. In this case, the electric solenoid actuator may be described as an actuator with two pilots or two plungers. When an electric current is passed through the solenoid, the two pilots move closer to each other to reduce reluctance and therewith also the magnetic energy. But this movement creates pressure differences between the first and second cavities which cause the valve member to be displaced in generally opposite direction, resulting ultimately in a substantial displacement of the valve member.

The fluid valve according to the present disclosure preferably includes a spring and one extremity of the valve member is connected to said valve body via said spring.

Said external pressure is preferably a high pressure.

The pilot may be connected to a spring.

According to a possible embodiment, the pilot is perforated by a longitudinal hole. With this preferred embodiment, it is possible to produce a pressure in one of said first and second cavities that is defined solely by the force produced by the solenoid actuator. Accordingly, this pressure is independent of the reference pressure, which is generally a high pressure.

According to one possible embodiment, said valve member is perforated by a longitudinal hole which enables communication between said first and second cavities when it is not blocked. Accordingly, said pilot is preferably configured such that it is able to block said longitudinal hole in the valve member. In this case, said pilot is preferably located in said first cavity and said communication channel is able to establish communication between said first cavity and said external pressure source (or reference pressure), which is then preferably a high pressure. The second cavity is then preferably in communication with a low pressure.

According to one possible embodiment, the valve member comprises two parts that are coupled mechanically. In this case, said two parts of the valve member are preferably each perforated by a longitudinal hole which serves to establish communication between said first and second cavities when said longitudinal holes are not blocked. In that case, said first and second cavities are preferably located on either side of the valve element. Said pilot then preferably comprises a round protuberance (or element) located between said two parts of the valve member, which is designed to block a longitudinal hole in one of said two parts of the valve member. With this preferred embodiment, it is possible to produce a movement of the movable valve member that is independent of any variation in the reference pressure. This reference pressure is preferably a high pressure.

Said communication channel with said external pressure source preferably includes a filter. With this, it is possible to satisfy a need for clean fluid.

The pilot preferably has rotational symmetry.

The fluid valve according to the present disclosure is capable of splitting a fluid flow between two paths (for example two outlets) proportionally, that is to say 50%-50%, in response to a low power command signal which may be transmitted by a computer. The fluid valve according to the present disclosure may be used with various fluids such as: oil, engine oil, fuel. The fluid valve according to the present disclosure might also be used with other fluids. The fluid valve according to the present disclosure preferably includes one or more filters or anti-pollution devices (seals, leakage paths for example) to reduce the risks of blocking the valve member. The fluid valve according to the present disclosure may be used in a hydraulic circuit of an aircraft equipment element such as: hydraulic circuit for landing gear.

The inventors also suggest a hydraulic circuit for an aircraft equipment element (for example hydraulic circuit for landing gear), a fuel cell system, a turbomachine and an aircraft equipped with one or more fluid valves according to the present disclosure.

BRIEF DESCRIPTION OF THE FIGURES

These aspects as well as other aspects according to the present disclosure will be explained in the following detailed description of specific embodiments of the present disclosure with reference to the drawings in the figures, in which.

The drawings in the figures are not to scale. Generally, equivalent elements are denoted using the same reference signs in the figures. The use of reference numbers in the drawings is not to be construed as limiting, even when said numbers are also cited in the claims.

DETAILED DESCRIPTION

Figure 1:
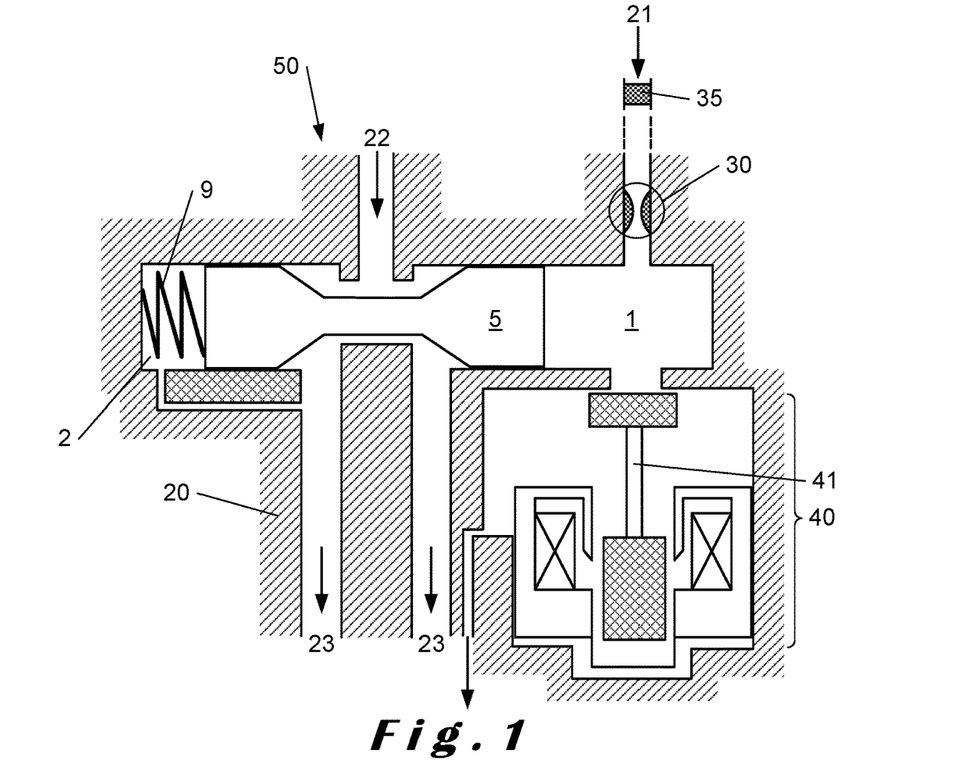
FIG. 1 shows a possible embodiment of the fluid valve according to the present disclosure.

FIG. 1 shows an exemplary embodiment of fluid valve 50 according to the present disclosure. It comprises a hollow valve body 20 hollow and three ducts: one inlet 22 and two outlets 23. Outlet 23 on the left is preferably a by-pass outlet, this term being known to a person skilled in the art. Outlet 23 on the right is preferably an engine outlet. Valve member 5 or the valve slide is movable inside hollow valve body 20. The shape of valve member 5 relative to the hollow of hollow valve body 20 is such that a variation in the position of valve member 5 enables a flow rage of a fluid between inlet 22 and one or both outlets 23 to be varied. As is shown in FIG. 1, one extremity of valve member 5 is preferably connected or coupled to valve body 20 via a spring 9. Valve member 5 defines a first cavity 1 on the right side thereof and a second cavity 2 on the left side thereof, adjacent to spring 9. Second cavity 2 is preferably pressurised to the downstream pressure level as shown in FIG. 1. The pressure of first cavity 1 is regulated via a communication channel 21 with a reference pressure (or external pressure source) which in this case is a high pressure, and via a communication channel with a cavity that accommodates electric actuator 40, which itself has a by-pass outlet. Communication channel 21 with the external pressure source has a constriction 30.

Fluid valve 50 also comprises an electric solenoid actuator 40 having a coil and a movable ferromagnetic pilot 41. When an electric current is applied to the coil of electric actuator 40, ferromagnetic pilot 41 generally moves in order to reduce reluctance (a term known to one skilled in the art) or so as to balance the overall magnetic energy.

Regarding the example of FIG. 1, when an electric current flows through the coil of the solenoid actuator, pilot 41 moves upwards, restricting the communication between first cavity 1 and the by-pass outlet (configuration shown in FIG. 1). This raises the pressure in first cavity 1 because pilot 41 prevents balancing of the pressures in first cavity 1 and the by-pass outlet. Since the pressure in second cavity 2 is the same as the pressure in the by-pass outlet, a pressure differential is created between first 1 and second 2 cavities. This in turn exerts a displacement force to the left on valve member 5. If this displacement force is large enough, valve member 5 moves to the left. If the high pressure or external pressure via communication channel 21 decreases, the force exerted by actuator 41 remains constant because it is only dependent on the current in its coil. Constriction 30 will then tighten to maintain the pressure in the first cavity.

Figure 2:
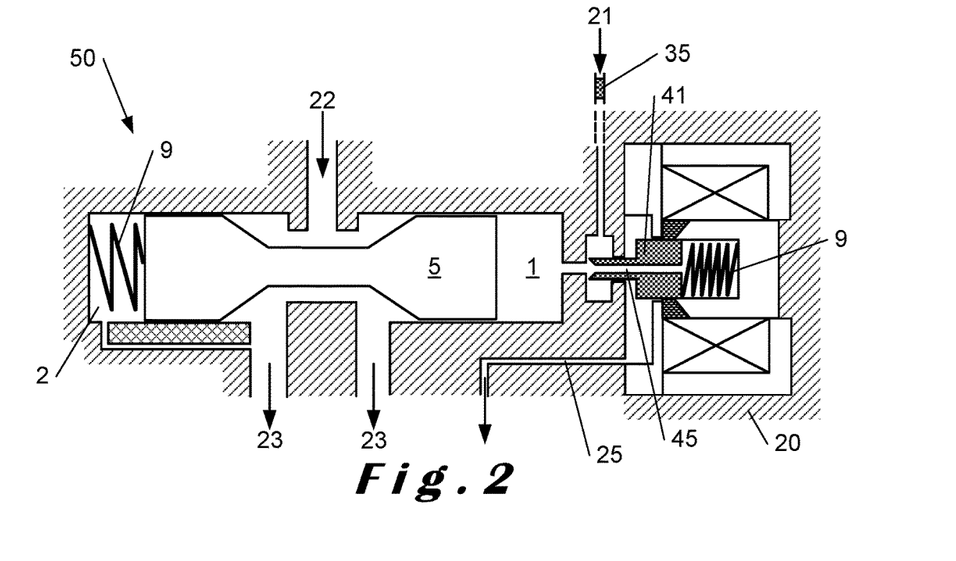
FIG. 2 shows another embodiment of said fluid valve.

FIG. 2 shows another embodiment of fluid valve 50 according to the present disclosure. As illustrated in this figure, fluid valve 50 preferably has a filter 35 upstream of communication channel 21 to satisfy the need for clean oil. In fact, the fluid for the reference pressure, for example a high pressure, may be engine oil, for example, which may contain many particles that may be trapped in the constrictions. It is important to filter these particles out as they might otherwise clog fluid valve 50.

Second cavity 2 generally has a low pressure, denoted by LP in the following text. Cavity 1 generally has a medium pressure, denoted by MP in the following text. The reference pressure upstream of communication channel 21 general has a high pressure, denoted by HP in the following text. The pressure that is significant for the functioning of fluid valve 50 according to the present disclosure is the MP pressure MP of first cavity 1 or the amplification cavity. The difference between MP and LP defines the displacement force that may act on movable valve member 5. This valve member is connected to a spring.

In the embodiment of FIG. 2, pilot 41 of solenoid actuator 40 is connected to a spring 9 which biases pilot 41 against its seat on the left in the absence of a magnetic force exerted by the coil of solenoid actuator 40. When pilot 41 is in this position, pressure MP of first cavity 1 is equal to the valve outlet pressure due to escape via the machining gaps and due to longitudinal hole 45 in pilot 41. The machining gaps (or passage between pilot 41 and a cylindrical wall that surrounds it) constitute the fixed limiter 30.

When solenoid actuator 40 exerts a force on pilot 41, the force is such that it attracts the pilot to the right. A fluid (oil, for example) at a pressure HP then passes through longitudinal hole 45 in pilot 41 and reaches a cavity in which the spring 9 connected to pilot 41 is located. When pressure MP becomes great enough, it will serve to close pilot 41 against its seat again, because a part of pilot 41 is exposed to the outlet pressure LP, which is lower (see FIG. 3 for example). Finally, the pressure in first cavity 1 and in the cavity of spring 9 of pilot 41 are equal due to longitudinal hole 45 in pilot 41. The pressure in second cavity 2, LP, is equal to the outlet pressure of the valve, which is lower. The net result is that a displacement force to the left is exerted on valve member 5.

Figure 3:
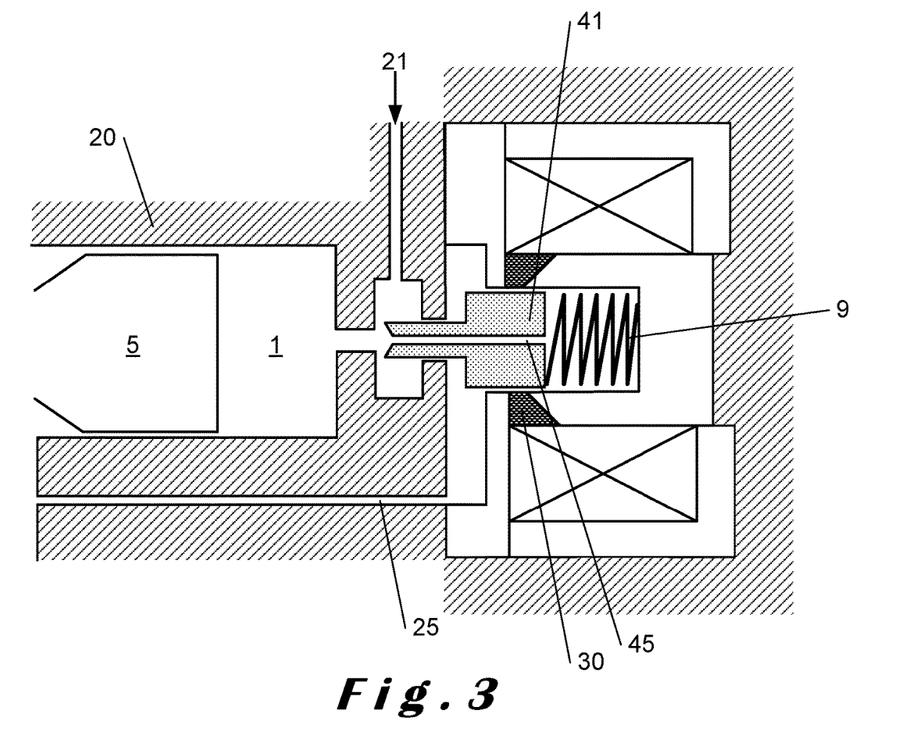
FIG. 3 shows an enlarged view of the electric actuator of the embodiment shown in the preceding figure.

With reference to FIG. 3, the various forces acting on pilot 41 are:
the force of spring 9 acting on pilot 41. In the example of FIGS. 2 and 3, this force is applied towards the left (compression spring 9). This has the effect of pushing pilot 41 against its seat when no current is present in the coil of solenoid actuator 40 and the pressure in the cavity containing spring 9 is not increased. The spring 9 connected to pilot 41 is not essential since the hydraulic pressure which is always present will always push pilot 41 to the left. If a spring 9 is connected to pilot 41 as shown in FIGS. 2 and 3, a spring 9 will preferably be chosen having a moderate spring constant because the magnetic force exerted on ferromagnetic pilot 41 by the coil of solenoid actuator 41 must be able to overcome the force exerted by spring 9.

The magnetic force applied to ferromagnetic pilot 41 by the coil of solenoid actuator 40, acting to the right.

Pressure loads. Regarding reference pressure HP, this is applied over the entire contour of pilot 41, which is cylindrical in shape. The loads thus cancel each other out.

If one considers that the loads acting to the right are negative and those acting to the left are positive, the following equation is obtained:

$$-MP*S_1-LP*(S_2-S_1)+MP*S_2=(MP-LP)*(S_2-S_1)$$

Surface S1 (or S2) is the vertical surface of the left (or right) extremity of pilot 41. Since $S_2$ is greater than $S_1$ and MP is greater than LP, the pressure loads tend to the positive and therefore tend to be directed to the left (tending to close pilot 41).

Finally, pilot 41 is in equilibrium when the magnetic force is equal to the sum of the pressure loads and the load of spring 9 (which is generally negligible for the reasons given earlier). The following equation is derived:

$$(MP-LP)*(S2-S1)+F\text{spring}=F\text{magnetic}$$

(MP−LP) and (S2−S1) are generally constant.

It will then be noted that pressure MP is defined solely by the force generated by the solenoid, and independently of pressure HP (but not of LP). However, LP may provide greater stability than HP since it is connected directly to a reservoir, for example.

Spring 9 connected to pilot 41 is not essential. If such a spring 9 is not present, it is advisable to provide a limit stop (preferably amagnetic) to the right of pilot 41 so that there is always hydraulic pressure to the right of the pilot that can push it back to close the constriction towards first cavity 1 again.

Figure 4:
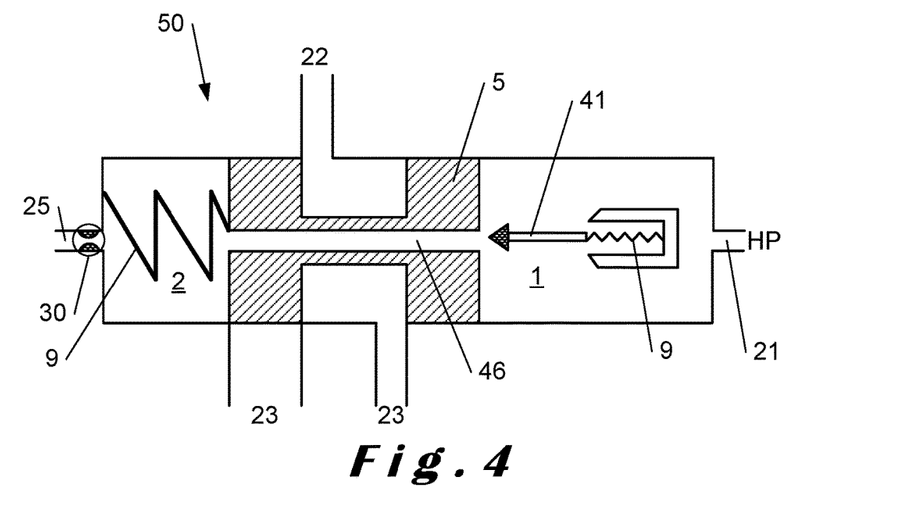
FIG. 4 shows another embodiment of said fluid valve.

FIG. 4 shows another possible embodiment of fluid valve 50 according to the present disclosure. Like the other embodiments, the basic idea is to modulate the pressure in a cavity via a fixed limiter (30) and a variable limiter (induced by pilot 41). Movable valve member 5 is always pushed towards pilot 41 by the action of a spring 9 connected to valve member 5. This produces a division of the hydraulic pressures such that valve member 5 does not touch pilot 41 and always remains slightly biased to its left. When the current in the coil of electric solenoid actuator 40 increases, pilot 41 moves to the left, causing a fall in the pressure in second cavity 2, which contains spring 9 (second cavity 2 is connected to an external pressure source via communication channel 25, which includes a fixed limiter 30). In fac, pilot 41 is designed to at least partly block the longitudinal hole 46 in valve member 5, which may assure communication between first 1 and second 2 cavities. The movement of pilot 41 to the left thus entrains a movement of valve member 5, also to the left. The movement of pilot 41 to the left may also cause the pressure in first cavity 1 to rise, thus also causing valve member 5 to move to the left.

An advantage of the embodiment of FIG. 4 is that if HP increases suddenly, the variable restriction of longitudinal hole 46 in valve member 5 opens, which also has the effect of raising the pressure in second cavity 2, and compensates for the variation in pressure HP so that valve member 5 is not excessively affected thereby.

Figure 5:
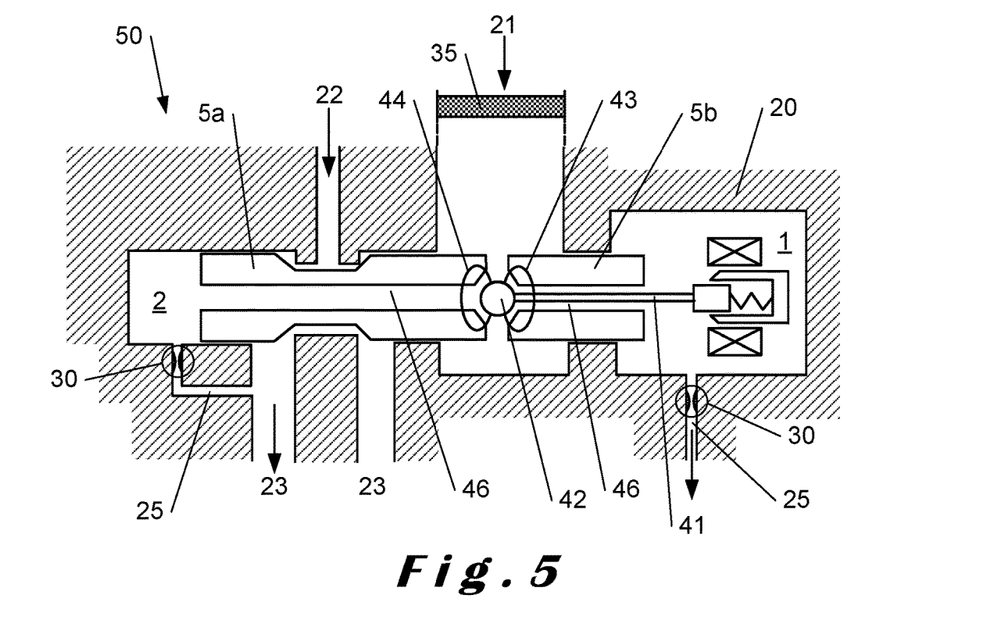
FIG. 5 shows another embodiment of said fluid valve.

FIG. 5 shows another possible embodiment of fluid valve 50 according to the present disclosure. As shown in FIG. 5, movable valve member 5 is not connected to a spring 9 in this embodiment. Communication channel 21 with a reference pressure or external pressure source (high pressure for example) preferably includes a filter 35. As is evident from the figure, valve body 20 here comprises two communication channels 25 with an external pressure source (in this case a single downstream pressure source). Each of these two communication channels 25 includes a fixed limiter 30.

In the embodiment of FIG. 5, pilot 41 comprises an element 42 in the shape of a bead or a round protuberance. Valve member 5 comprises two parts (5a, 5b), which are coupled mechanically. Each of the two parts (5a, 5b) is perforated by a longitudinal hole 46 to enable communication between first 1 and second 2 cavities when longitudinal holes 46 are not blocked. Element 42 of pilot 41 is designed to at least partly block longitudinal hole 46 of one or both parts (5a, 5b) of valve member 5 (variable limiter). When electric actuator 40 is activated, pilot 41 moves to the left (spring coupled to pilot 41 extended in this example). Section 44 of left part 5a of valve member 5 is then at least partly blocked, while section 43 of right part 5b is less blocked. The loss of charge via section 44 is therefore greater than the loss via section 43. The pressure inside first cavity 1 increases due to the configuration of communication channel 21 whereas that in second cavity 2 decreases. The two parts (5a, 5b) of valve member 5 thus move to the left.

Valve member 5 reaches equilibrium when pilot 41 reaches the position dictated by the force of electric actuator 40. In this case, the pressure between the two cavities (1, 2) is in equilibrium. The advantage of this embodiment is that it is unaffected by the variations in the amplification and supply pressures because it splits pressure HP introduced via communication channel 21 into the first 1 and second 2 cavities. The advantage of this embodiment is its response speed: fast transition.

Figure 6:
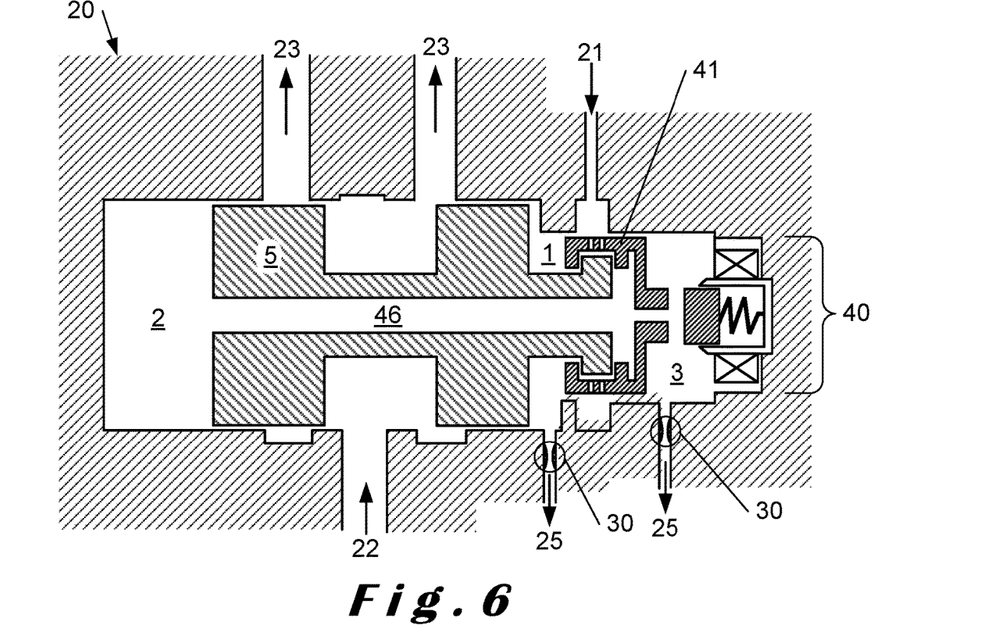
FIG. 6 shows another embodiment of said fluid valve.

FIG. 6 illustrates a version that is more stable than the previous embodiment. Here, first cavity 1 includes a part of movable pilot 41, while second 2 and third 3 cavities are present on either side of valve member 5 and are always under the same pressure due to the effect of a longitudinal hole 46 in valve member 5 and a part of pilot 41. When a current is applied to electric solenoid actuator 40, pilot 41 shifts to the right (pilot spring compressed here). The pressure of first cavity 1 is reduced and thus p(cavity 2)−p(cavity 1) becomes positive, causing valve member 5 to move to the right. This pressure disequilibrium exerts a leftward force on pilot 41. The system is thus stable because the pressure differential created by the movement of pilot 41 slows it down and stabilises it. As is shown in FIG. 6, the first 1 and second 2 cavities are connected to an external pressure source (low pressure for example) via two communication channels 25, each of which includes a fixed limiter 30.

Figure 7:
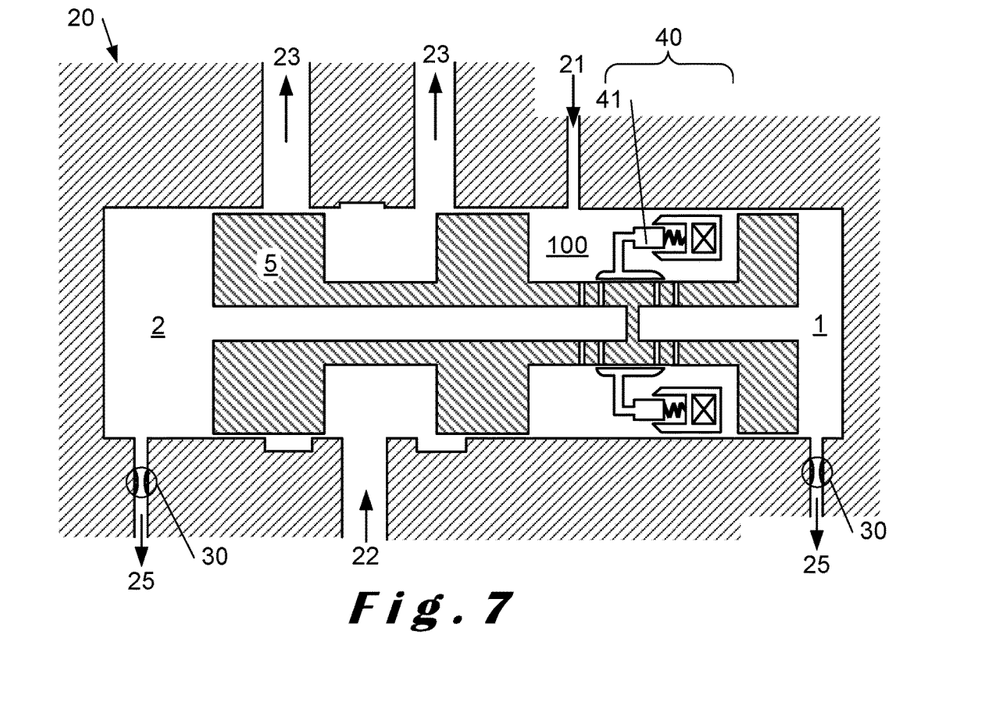
FIG. 7 shows another embodiment of said fluid valve.

FIG. 7 shows an equilibrated version of fluid valve 50. The hollow in valve body 20 contains a cavity 100 that accommodates actuator 40 and a communication channel 21 (without fixed limiter 30) with a reference pressure (for example a high pressure). Actuator 40 is thus exposed to a constant pressure equal to this reference pressure regardless of its position. The system is said to be in equilibrium. As shown in FIG. 7, the first 1 and second 2 cavities are connected to an external pressure source (low pressure for example) via two communication channels 25, each of which includes a fixed limiter 30.

Figure 8:
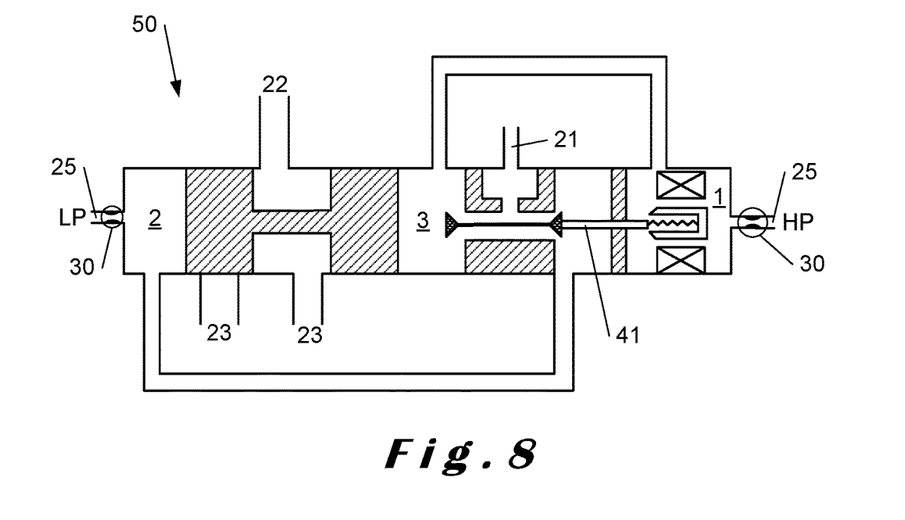
FIG. 8 shows another embodiment of said fluid valve.

FIG. 8 shows another particularly stable version of fluid valve 50. In this case, valve member 5 comprises three parts which are coupled mechanically (hatched areas). The reference pressure applied by communication channel 21 in the hollow of valve body 20 is preferably a high pressure HP. The first cavity is connected to a high pressure source via communication channel 25 with a fixed limiter 30. When electric actuator 40 is activated, pilot 41 shifts to the left. This has the effect of raising the pressure in third cavity 3, where the left extremity (or left protuberance) of pilot 41 is located. At the same time, the pressure in the cavity between third cavity 3 and first cavity 1, which is where the right protuberance of pilot 41 is located, falls or remains constant, because this cavity is in communication with LP via second cavity 2, which in turn is connected to an external pressure source LP via a communication channel 25 which includes a fixed limiter 30. The net effect is that the hydraulic force acting on pilot 41 is directed to the right, that is to say in the opposite direction to its displacement by the coil of solenoid actuator 40. The stability of fluid valve 50 is increased thereby.

Figure 9:
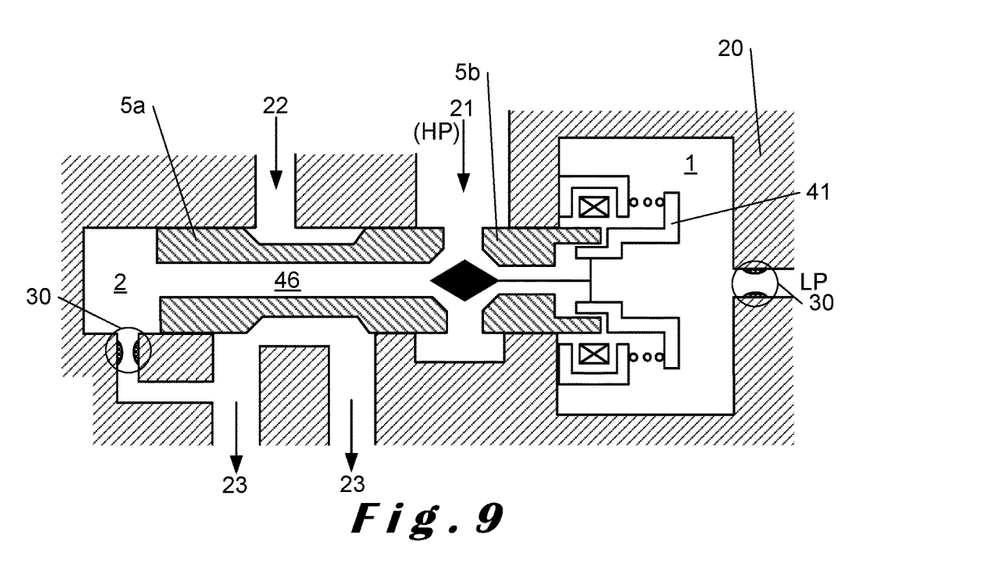
FIG. 9 shows another embodiment of said fluid valve.

FIG. 9 shows another embodiment of fluid valve 50. Valve member 5 comprises two part (5a, 5b). This embodiment is similar to that shown in FIG. 5. One difference consists in the fact that electric solenoid actuator 40 is able to exert a magnetic displacement force on valve member 5, because the right part 5b includes a ferromagnetic material, and a section of the right part 5b is located within the lines of the magnetic fields generated by the actuator when it is activated. When it is activated, pilot 41, which also includes a ferromagnetic material, and the right part 5b of valve member 5 approach one another to reduce the global magnetic energy. This has the effect of blocking longitudinal hole 46 of left part 5a more completely than the hole in the right part, causing valve member 5 to shift to the left. The reference pressure introduced by communication channel 21 is preferably a high pressure HP. Electric actuator 40 in the fluid valve of FIG. 9 might be described as a dual plunger or dual pilot electric actuator 40 due to the presence of pilot 41 and of part 5b, which are able to move when a current is present in the coil of solenoid actuator 40.

Figure 10:
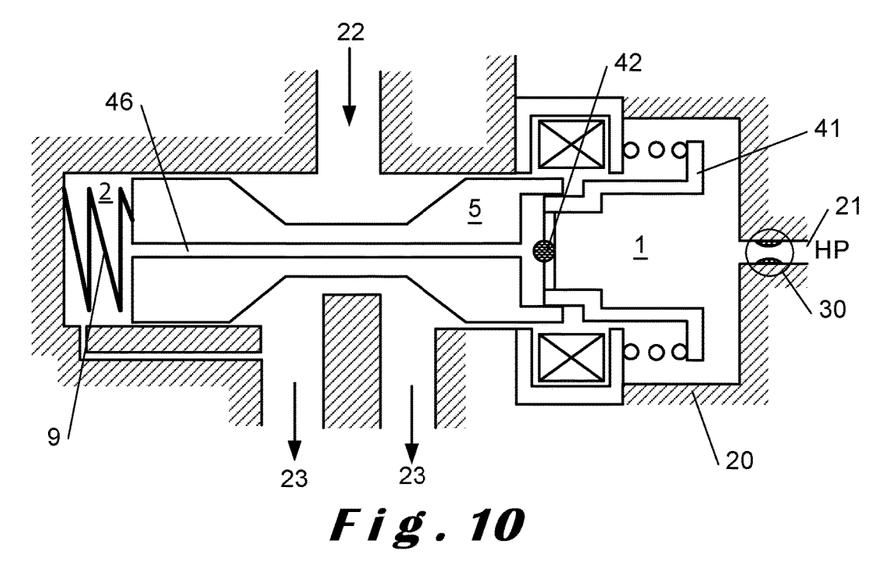
FIG. 10 shows another embodiment of said fluid valve.

FIG. 10 shows another embodiment of fluid valve 50, in which, unlike the above, valve member 5 comprises a longitudinal hole 46 that may be at least partially blocked by an element 42 of pilot 41, shaped like a bead in FIG. 10. Valve member 5 is connected to hollow valve body 2 via a spring 9. This spring 9 is located in a second cavity 2 connected to an outlet 23 via a channel. A first cavity 1 accommodating solenoid actuator 40 may be connected to a reference pressure source, for example a high pressure HP, via a communication channel 21 which includes a fixed limiter 30.

Figure 11:
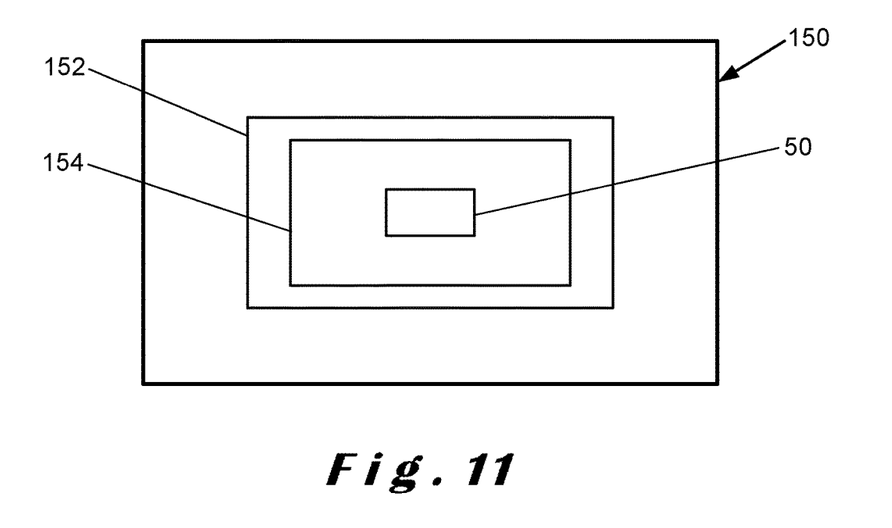
FIG. 11 shows a schematic diagram of an aircraft having a fluid valve according to any of the embodiments of FIGS. 1 through 10.

FIG. 11 show a schematic diagram of a representative embodiment of an aircraft 150 having a fluid valve 50 according to any of the previously described embodiments. In the illustrated embodiment, the fluid valve 50 forms part of a hydraulic circuit 154, which is itself a component of an item of aircraft equipment 152.

The present disclosure has been described with reference to specific concrete embodiments thereof, which are purely illustrative in nature and are not to be considered limiting in any way. In general, the present disclosure is not limited to the examples illustrated and/or described above. The use of the verbs "include", "comprise", "contain" or any variant thereof and any conjugated form thereof may not be construed as exclusive of the presence of any of the other elements described. The use of the indefinite article "a", "an", or the definite article "the" to introduce an element does not preclude the present of a plurality of these elements. The reference numbers in the claims are not limiting of the scope thereof.

In summary, the various aspects present disclosure may also be described as follows: Fluid valve 50 for a hydraulic circuit in an aircraft and comprising:
- a valve body 20 comprising one inlet 22, two outlets 23 and a communication channel (21; 25) with an external pressure source;
- an electric solenoid actuator 40 located inside valve body 20 and including a movable ferromagnetic pilot 41;
- a valve member 5 movable inside valve body 20 to at least partially block a passage between said inlet 22 and one of the two outlets 23, said valve member 5 defining at least part of a first 1 and a second 2 cavity,
- a fixed limiter 30 in said communication channel (21; 25) such that a displacement of said movable pilot 41 causes a variation in pressure in one of said first 1 and second 2 cavities to produce a force for moving said valve member 5.

While illustrative embodiments have been illustrated and described, it will be appreciated that various changes can be made therein without departing from the spirit and scope of the present disclosure.

The embodiments of the present disclosure in which an exclusive property or privilege is claimed are defined as follows:

1. A fluid valve for a hydraulic circuit in an item of aircraft equipment, comprising:
    - a hollow valve body comprising one inlet, two outlets and a communication channel with an external pressure source;
    - an electric solenoid actuator located in the hollow of the hollow valve body and including a movable ferromagnetic pilot;
    - a valve member movable inside the valve body to at least partially block a passage between said inlet and one of the two outlets, said valve member at least partially defining a first and a second cavity located on either side of said valve member in the hollow of valve body, and
    - a fixed limiter in said communication channel such that a displacement of said movable pilot causes a variation in pressure in one of said first and second cavities to produce a force for moving said valve member to vary a flow rate of a fluid between the inlet and the two outlets,
    - wherein at least a section of said member contains a ferromagnetic material, and that said electric solenoid actuator is configured to exert a magnetic displacement force on said ferromagnetic section of the valve member.

2. The fluid valve according to claim 1, wherein the fluid valve is configured such that a displacement of said movable pilot causes a pressure variation to produce a force on said pilot in the opposite direction to said displacement.

3. The fluid valve according to claim 1, wherein said fixed limiter comprises a passage between the pilot and a cylindrical wall that surrounds it.

4. The fluid valve according to claim 1, wherein said pilot is connected to a spring.

5. The fluid valve according to claim 1, wherein said valve member is perforated by a longitudinal hole to establish communication between said first and second cavities when it is not blocked, and that said pilot is configured to block said longitudinal hole in the valve member.

6. A hydraulic circuit in an item of aircraft equipment, comprising a fluid valve according to claim 1.

7. An aircraft comprising a fluid valve according to claim 1.

* * * * *